Figure 1:
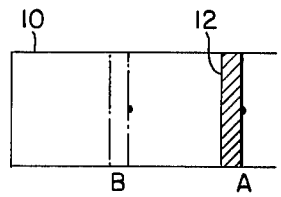

June 21, 1966     A. G. J. DOBOSSY     3,256,691
HEAT ENGINE AND METHOD OF OPERATING SAME
Filed Feb. 2, 1965     2 Sheets-Sheet 1

INVENTOR.
ANDREW G.J. DOBOSSY
BY
*Morse, Altman + Oates*
ATTORNEYS

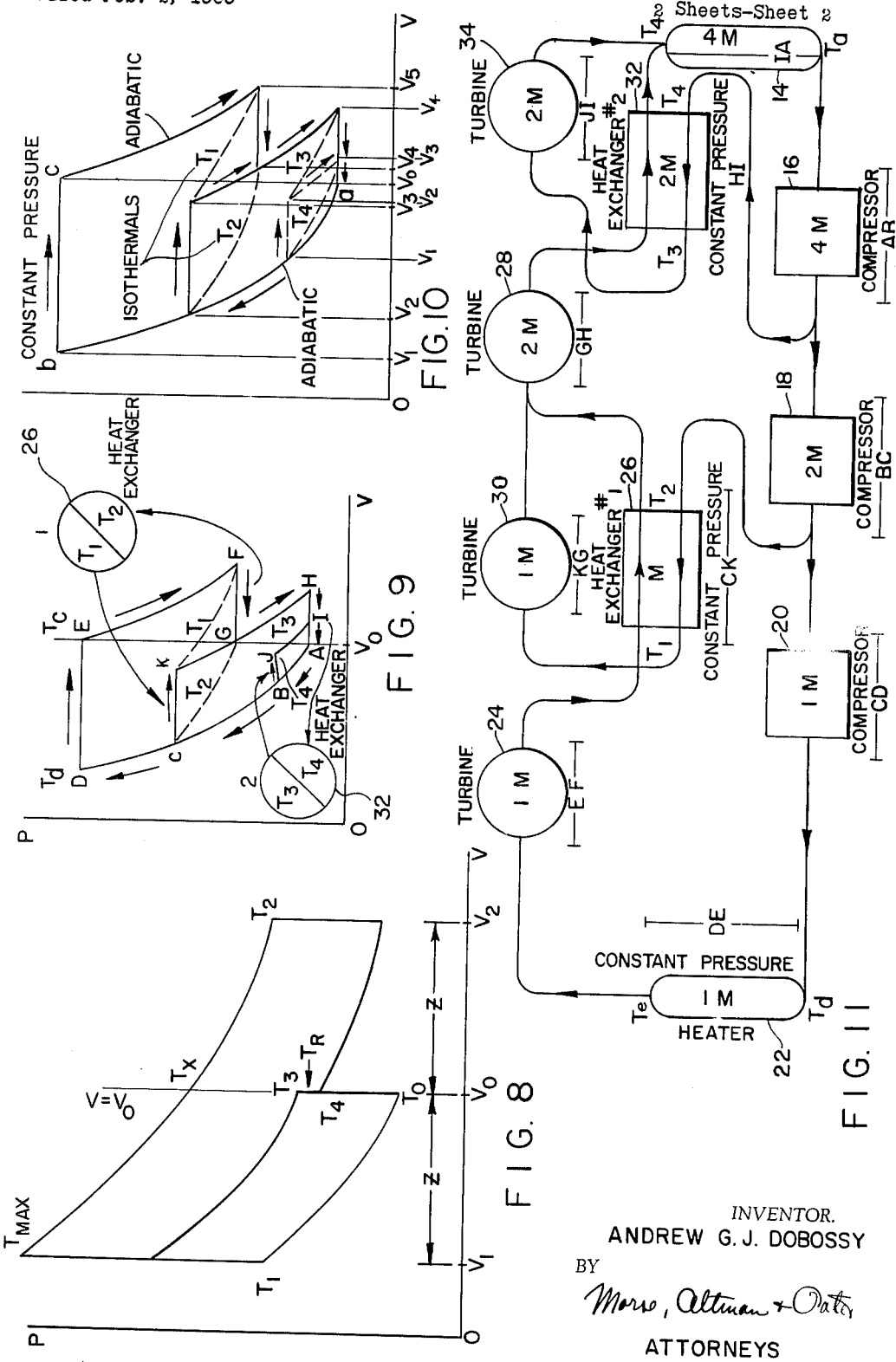

United States Patent Office 3,256,691
Patented June 21, 1966

3,256,691
HEAT ENGINE AND METHOD OF OPERATING SAME
Andrew G. J. Dobossy, 58 Westland Ave., Boston, Mass.
Filed Feb. 2, 1965, Ser. No. 429,840
7 Claims. (Cl. 60—59)

This invention relates generally to heat engines and their operation, and more particularly is directed towards a highly efficient heat engine system and includes a novel method of substantially improving the operating efficiency of heat engines.

Heretofore heat engines have been assumed to have inherent limitations with regard to their efficiency and operation. Carnot has defined the cycle of heat engines, typically gas, as comprising isothermic and adiabatic expansions followed by isothermic and adiabatic compressions. The efficiency of a Carnot engine depends only on the temperatures between which it works. The efficiency of any engine has been defined as the ratio between the heat transformed into useful work by the engine and heat taken in from external sources. Hence for a Carnot engine $$\text{efficiency} = \frac{H_1 - H_2}{H_1}$$

In the case of a Carnot engine, the efficiency was also given by the expression $$E = \frac{T_1 - T_2}{T_1}$$

where $T_1$ is the temperature of the hot body from which the heat is taken and $T_2$ is the temperature of the cold body to which the heat not transformed into useful work is delivered. In both cases, these temperatures are measured on the absolute scale of temperatures. No engine, according to the Carnot theorem, can have a greater efficiency than a Carnot engine working between the same temperatures.

Because of the broad acceptance of the Carnot theorem progress has been limited in the air standard efficiency of heat engines. In practice the efficiency of heat engines now available is in the range of about 20–30%.

Accordingly, it is an object of the present invention to provide improvements in heat plants.

Another object of this invention is to increase the efficiency of heat plants including those that employs gas to perform work as well as those that work upon the gas as in a refrigeration system.

Still another object of this invention is to provide a novel method of operating a heat plant.

More particularly, this invention features a heat plant comprising a gas system having a heating stage, multiple compriession and expansion stages, a cooling stage, and multiple heat exchanging stages interconected between selected compression and expansion stages in such a manner that the output from one expansion stage before entering a subsequent expansion stage is employed to heat a portion of the gas input to still another stage. The output of this other stage is combined with the output of the first stage which is passed through the heat exchanger to drive the subsequent stage. The exhaust of the subsequent stage is passed through a second heat exchanger, to heat a portion of the circulating gas prior to entry into a fourth stage. The exhaust of all stages are combined and cooled to an original condition. The arrangement is such that the cooling of the gas from one adiabatic to another is accompanied by a heating process between two other adiabatics. The cooling and heating of the gas takes place between the same temperature limits and the expansions alternate from an initial volume to a greater volume and from a smaller volume to the initial volume with the compressions alternating in a reversed manner.

This invention also features a novel method for cycling a gas medium in a heat engine comprising passing the gas through a plurality of compression and expansion cycles and connecting the adiabatic paths in such a manner that the cooling of the gas from one adiabatic to the other is accompanied by a heating process between two other adiabatics. The cooling and heating of the gas is made to take place between the same temperature limits and the expansions alternate from an initial volume to a greater volume and from a smaller volume to the initial volume with compressions alternating in a reversed manner.

However, these and other features of the invention along with further objects and advantages thereof will become more readily apparent from the following detailed description of a preferred embodiment of the invention, with reference being made to the accompanying drawings, in which:

FIG. 1 is a cross sectional view in side elevation of a piston and cylinder illustrated for explanatory purposes, FIGS. 2 through 10 are pressure-volume curves for heat engines employed to explain the invention, and FIG. 11 is a schematic diagram of a gas system made according to the invention.

Figure 2:
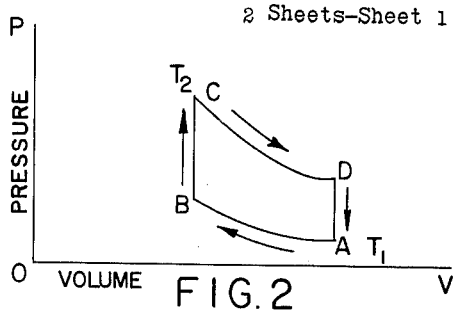

When the theoretical operation of heat engines is represented diagramatically, then we deal with what is known as the standard air cycle of the given engine. In FIG. 2 are plotted in sequence all the points that represent the conditions of the working substance, or of an idealized working substance as it goes through the cycle of operation. So that, using the pressure-volume diagram, where vertical coordinates represent the pressure and the horizontal coordinates, the volume, the cycle of one type of heat engines will be described as follows:

As shown in FIG. 1, a cylinder 10 is filled with air which is at an initial pressure and volume. This condition being represented by point A on the PV-diagram. Now a piston 12 is moved from A to B compressing adiabatically the air to a smaller volume and greater pressure; point B on the diagram. While the piston is being kept at B, the fluid is heated in any suitable manner, so that while the volume remains constant, the temperature rises, which causes an increase in the pressure. This heating operation is the line BC on the PV-diagram. Now the piston is moved back to A by the adiabatic expansion of the working substance. The curve CD represents this expansion. The air is back at its initial volume, however its temperature, and therefore the pressure being higher than at the initial point A. In order to restore it to this initial condition it must be cooled, keeping the volume constant. This means that heat was not only absorbed by the engine, but heat was also rejected.

As the work done by the engine (area ABCD) equals the heat absorbed ($Q_a$) minus the heat rejected ($Q_r$), the efficiency $$E_h = \frac{Q_a - Q_r}{Q_a}$$

It is evident that the highest temperature reached, $T_2$ is at C, and the lowest $T_1$ at the initial point A. Now the theorem, known as Carnot's theorem in thermodynamics, states that no cycle can have an efficiency higher than that given by the formula $$\frac{T_2 - T_1}{T_2}$$

In the case just discussed, $$\frac{Q_a - Q_r}{Q_a} < \frac{T_2 - T_1}{T_2}$$

It can be shown how this limit of efficiency can be surpassed, that is, an air cycle will be described whose efficiency exceeds the Carnot efficiency. Also there will be described a system embodying the principles of an air cycle having an efficiency which exceeds Carnot's efficiency.

In the following discussion it will be assumed first, that the ideal gas laws hold between the temperature limits considered, and, secondly, that a heat exchanger or regenerator using the graduated method of heating is assumed to work with maximum efficiency between two temperature limits, the values of which are within the temperature limits considered in the first assumption, that is, the temperature limits of the cycle. Therefore if the cycle operates between $T_1$ and $T_2$ then $T_3 < T_1$ and $T_4 > T_2$ where $T_3$ and $T_4$ are the temperature limits of any regenerator used in the system.

The following description of the theoretical operation of a regenerative air cycle is for a given volumetric expansion moving along adiabatic and constant volume paths only. The efficiency of this cycle is a function of the number of the heat exchanging operations performed only, so that if the number of heat exchanging operations performed is $n$, then efficiency $= f(n)$ and as $n$ approaches infinity the efficiency approaches 100%. Furthermore, although the efficiency will reach its maximum only when $n =$ infinity, there is a finite number $a$ such that when $n = a$, the efficiency is greater than $$\frac{T_1 - T_2}{T_1}$$

which is the maximum efficiency obtainable by any engine according to Carnot's theorem.

Figure 3:
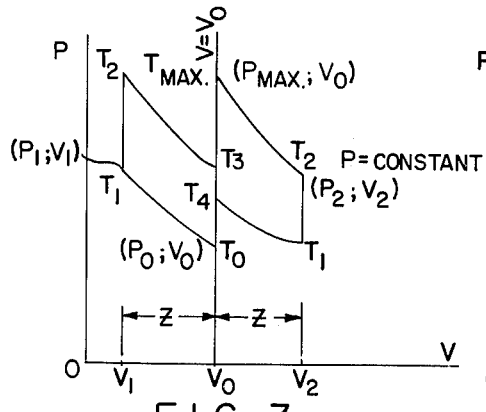

*Consideration I.*—Referring to the pressure volume diagram of FIG. 3, if we select two points along a constant pressure line where the two points represent two different conditions of the same working substance, then it follows that the temperature at $(P_1 V_1)$ is lower than at $(P_2 V_2)$. Since $$P_1 = P_2 \text{ and } P_1 = \frac{T_1 C}{v_1}$$

$$P_2 = \frac{T_2 C}{V_2} \quad \frac{T_1}{V_1} = \frac{T_2}{V_2}$$

$$\frac{T_1}{T_2} = \frac{V_1}{V_2} \quad V_1 < V_2 \text{ and } T_1 < T_2$$

Then if we divide the distance $(V_2 - V_1)$ by two, we obtain a value of $V = V_0$ on the V axis such that $$V_0 - V_1 = V_2 - V_0$$

We may denote these equal distances by the letters $Z$. Now if we draw the line $V = V_0$ and let an adiabatic going through point $(P_1 : V_1)$ and one going through point $(P_2 : V_2)$ intersect this line, we obtain two more points lying on the line $V = V_0$. These points represent the condition of the working substance at volume $V_0$ and pressures $P_0$ and $P_{max}$. It is evident that the temperature $T_{max}$ at $(P_{max}, V_0)$ is higher than at $(P_0 : V_0)$. Furthermore, since it is adiabatics that connect points $(P_{max} : V_0)$, $(P_2 : V_2)$ and $(P_0 : V_0)(P_1 : V_1)$, we may write the following inequalities: $T_{max} > T_2 > T_1 > T_0$.

Suppose the working substance were cooled from $(P_2 : V_2)$ at $T_2$ to temperature $T_1$ and heated from $(P_1 : V_1)$ at $T_1$ to $T_2$. Then it is obvious that heat rejected in one instance is the same as the heat absorbed at the other, and that both operations are performed between the same temperature limits. Therefore, in agreement with our second assumption heat may flow to the regenerator working between temperature limits $T_1$, $T_2$ at one time, and heat may flow from the regenerator or heat exchanger at another, without any loss of heat to the system. Now we have two additional points on the diagram lying on the lines $V = V_1$ and $V = V_2$ with the working substance at temperatures $T_2$ and $T_1$, respectively.

Points $$\left(\frac{T_1 C}{V_2} : V_2\right) \text{ and } \left(\frac{T_2 C}{V_1} : V_1\right)$$

can determine two more adiabatics which intersect the line $V = V_0$ yielding points $$\left(\frac{T_3 C}{V_0} : V_0\right) \text{ and } \left(\frac{T_4 C}{V_0} : V_0\right)$$

Since these two points at which the temperatures are $T_3$ and $T_4$ respectively lie on the adiabatics determined by the points $$\left(\frac{T_1 C}{V_2} : V_2\right) \text{ and } \left(\frac{T_2 C}{V_1} : V_1\right)$$

and since the respective values of V are $V_0$ $(V_0 - Z)$, $(V_0 + Z$ the following ratios are true:

$$\frac{T_3}{T_2} = \left(\frac{V_0 - Z}{V_0 + Z}\right)^{\gamma - 1} \text{ and } \frac{T_4}{T_1} = \left(\frac{V_0 + Z}{V_0}\right)^{\gamma - 1}$$

then $T_3 < T_2$ and $T_4 > T_1$ however $$\frac{T_1}{T_2} = \frac{V_0 - Z}{R_0 + Z} \text{ and } \frac{T_4}{T_2} = \frac{V_0 - Z}{V_0 + Z} \left(\frac{V_0 + Z}{V_0}\right)^{\gamma - 1} =$$

$$\frac{V_0 - Z}{V_0 (V_0 + Z)^{2 - \gamma}}$$

Then if $V_0$ is thought of as unity, it becomes clear that $$\frac{V_0 - Z}{V_0 (V_0 + Z)^{2 - \gamma}} < 1$$

in which case $T_4$ is less than $T_2$.

If heat is now rejected by cooling once from $T_3$ to $T_0$ and once from $T_4$ to $T_0$, then heat was lost by the system in the amount of $K_v(T_3 - T_0) + K_v(T_4 - T_0)$.

One thing becomes immediately clear, namely that if the working substance is at a state characterized by $(P_{max} : V_0)$ it is possible, with the aid of a heat exchanger to bring this substance to a point where its volume is equal to the volume at the initial point, rejecting heat less than it would have, had we cooled from the initial point.

Figure 4:
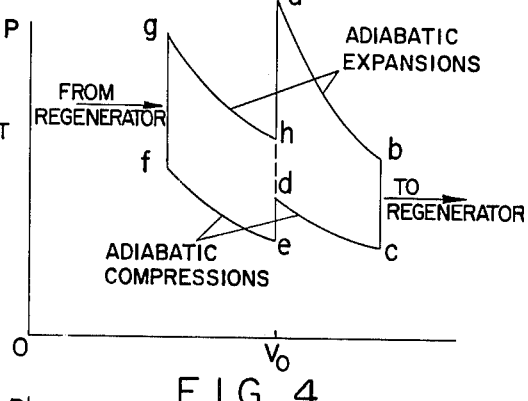

To summarize therefore and with reference to the PV diagram of FIG. 4, the substance is at $a$ and we want to bring it to point $e$. This could be accomplished by cooling it at a constant volume and thereby rejecting heat in the amount $Q_1$. Instead we let the working substance expand from $a$ to $b$ adiabatically, then from $b$ to $c$ cool it at constant volume rejecting heat to the regenerator, which heat, during operation $fg$, will be recovered. Then from $c$ along an adiabatic path it is compressed to $d$, from which point we cool it to $e$, losing heat $Q_I$. This is followed by an adiabatic compression $ef$. At $f$ the substance is heated by the regenerator, thereby bringing it to $g$ at constant volume. $gh$ is an adiabatic expansion. From $h$ it is cooled again to $e$, losing heat $Q_{II}$. In the first operation $Q_1$ amount of heat was lost, in the second $Q_I + Q_{II}$. Let $Q_2 = Q_I + Q_{II}$ the total heat lost in this operation. Now $Q_1 > Q_2$. This can be easily verified if we consider that in the latter case, work was done by the system but no heat was supplied to it, so that part of its own heat energy went into work. In the first case $Q_i - Q_f = Q_1$ (where $Q_i$ = internal heat energy at the intial condition, $Q_f$ = internal heat energy at the final condition). In the second $Q_i - Q_f = Q_2 + W$ (where $W$ = work done by the system) then $Q_2 + W = Q_1$, and since $W$ is positive $Q_2 < Q_1$.

If points $a$ and $e$ described in conjunction with FIGS. 3 and 4 represent two points of a cycle, namely, those two points between which the substance cools rejecting heat, then it becomes evident that instead of cooling from $a$ to $e$ we perform the operation discussed, the system loses less heat and does more work, thereby increasing the efficiency of the cycle.

Figure 5:
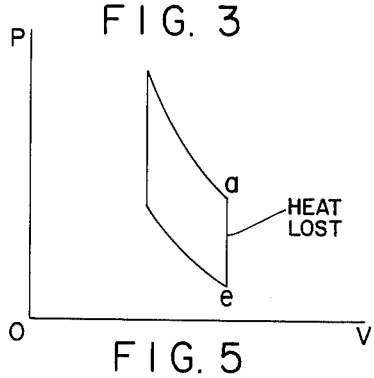
Figure 6:
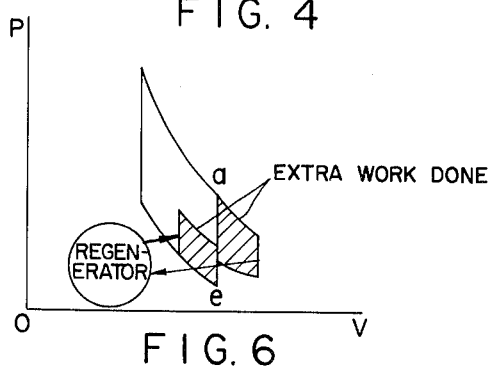
Figure 7:
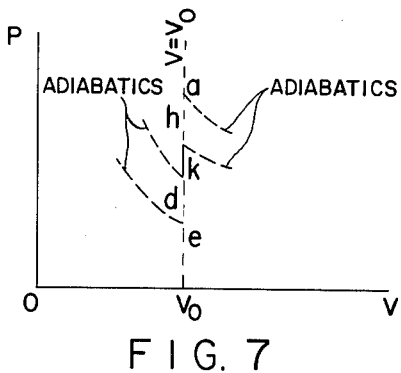

Referring now more particularly to FIGURES 5, 6 and 7, at $e$ the cycle is at its initial point and the temperature at this point represents the lower temperature limit, above which the system works. Now we have seen how the substance can be moved between two points, two points that lie on a constant volume line to two other points lying on the same line. (Points $a$ and $e$, and $h$ and $d$, of FIGS. 3 and 4.) From these two points, we cooled the substance to the lower point (point $e$) separately. Now let us suppose that both times the substance can be brought before cooling to an intermediate temperature $T_5$ from which it can be cooled to $T_0$. Then the volume when the temperature is $T_5$ will still be $V_0$. Let us denote this point between $h$ and $d$ by $k$. Then temperature $T_5$ can be thought of as the mean between $T_3$ and $T_4$. So that before cooling from $h$ to $e$ we lower the temperature from $T_3$ to $T_5$, thereby bringing point $h$ to point $k$ and raise temperature $T_4$ to $T_5$, bringing $d$ also to $k$. This can be accomplished by a secondary heat exchanger or regenerator, which regenerator, however, is not the one discussed previously and is not accounted for in $n$, being introduced merely for simplicity's sake. Now we can cool the substance twice from temperature $T_5$ and by doing this, rejecting the same amount of heat by the system as we would by cooling it once from $T_3$ and once from $T_4$.

$$T_5 = \tfrac{1}{2}(T_4 - T_3)$$
$$Q_2 = K_v(T_4 + T_3 - 2T_0)$$
$$Q_2 = K_v\left(2\frac{T_4 + T_3}{2} - 2T_0\right)$$
$$Q_2 = 2K_v\left(\frac{T_4 + T_3}{2} - T_0\right)$$
$$Q_2 = 2K_v(T_5 - T_0)$$

It is seen that the secondary regenerator does not affect the efficiency.

If, however, we thought of this new point $k$ at which the substance is at temperature $T_5$ as another point lying on the lie $V = V_0$ and one of another set of two points on a constant volume line, the other being the same point $e$, we could repeat the operation introduced in the consideration of FIGS. 3 and 4. Although this time we would have to perform it twice. (The substance would have to be cooled twice from $k$ to $e$.)

Now it becomes quite evident that this operation may be repeated as many times as we please bringing temperature $T_R$, from which the substance is cooled to $T_0$ nearer and nearer to this value. So that as the number of the regenerative operations increases, the temperature $T_R$ approximates $T_0$. In other words, $$\lim_{n \to \infty} T_R = T_0$$

Now the efficiency as a function of $n$ and the compression and expansion ratios can be calculated mathematically.

Referring now more particularly to FIG. 8, the following series of equations have been derived to show the efficiency of the cycle.

$$T_1 = T_0\left(\frac{V_0}{V_0 - Z}\right)^{\gamma - 1}$$
$$T_2 = T_1\left(\frac{V_0 + Z}{V_0 - Z}\right)$$
$$T_2 = T_0\frac{V_0^{\gamma - 1}(V_0 + Z)^\gamma}{(V_0 - Z)}$$
$$T_{\max} = T_2\left(\frac{V_0 + Z}{V_0 - Z}\right)^{\gamma - 1}$$
$$T_{\max} = T_0\frac{V_0^{\gamma - 1}(V_0 + Z)^\gamma}{(V_0 - Z)^{(2\gamma - 1)}}$$
$$T_1 = T_2\frac{V_0 - Z}{V_0 + Z}$$
$$T_3 = T_2\left(\frac{V_0 - Z}{V_0}\right)^{\gamma - 1}; \quad T_4 = T_1\left(\frac{V_0 + Z}{V_0}\right)^{\gamma - 1}$$

$$T_4 = T_2\frac{V_0 - Z}{V_0 + Z}\left(\frac{V_0 + Z}{V_0}\right)^{\gamma - 1} = T_2\frac{(V_0 + Z)^{\gamma - 2})V_0 - Z)}{V_0^{\gamma - 1}}$$
$$T_4 = T_2\frac{V_0 - Z}{V_0^{\gamma - 1}(V_0 + Z)^{2 - \gamma}}$$

Let $T_R$ denote the temperature from which the substance is cooled.

$$T_R = \frac{T_3 + T_4}{2}; \quad T_R = \frac{T_2}{2}\left[\left(\frac{V_0 - Z}{V_0}\right)^{\gamma - 1} + \frac{V_0 - Z}{V_0^{\gamma - 1}(V_0 - Z)^{2 - \gamma}}\right]$$
$$T_R = \frac{T_0}{2}\frac{V_0^{\gamma - 1}(V_0 + Z)}{(V_0 - Z)^\gamma}\left[\left(\frac{V_0 - Z}{V_0}\right)^{\gamma - 1} + \frac{V_0 - Z}{V_0^{\gamma - 1}(V_0 + Z)^{2 - \gamma}}\right]$$
$$T_R = \frac{T_0}{2}\left[\frac{V_0 + Z}{V_0 - Z} + \left(\frac{V_0 + Z}{V_0 - Z}\right)^{\gamma - 1}\right]$$
$$T_x = T_2\left(\frac{V_0 + Z}{V_0}\right)^{\gamma - 1} = T_0\left(\frac{V_0 + Z}{V_0}\right)^{\gamma - 1}\frac{V_0^{\gamma - 1}(V_0 + Z)}{(V_0 - Z)^\gamma} = T_0\left(\frac{V_0 + Z}{V_0 - Z}\right)^\gamma$$
$$\frac{T_x}{T_0} = \left(\frac{V_0 + Z}{V_0 - Z}\right)^\gamma; \quad \left(\frac{T_x}{T_0}\right)^{1/\gamma} = \frac{V_0 + Z}{V_0 - Z}$$
$$Z = V_0\frac{\left(\frac{T_x}{T_0}\right)^{1/\gamma} - 1}{\left(\frac{T_x}{T_0}\right)^{1/\gamma} + 1}$$

then $$T_R = \frac{T_0}{2}\left[\frac{V_0 + \frac{V_0(T_x/T_0)^{1/\gamma} - 1}{V_0(T_x/T_0)^{1/\gamma} + 1}}{V_0 - V_0\frac{(T_x/T_0)^{1/\gamma} - 1}{(T_x/T_0)^{1/\gamma} + 1}} + \left(\frac{V_0 + V_0\frac{(T_x/T_0)^{1/\gamma} - 1}{(T_x/T_0)^{1/\gamma} + 1}}{V_0 - V_0\frac{(T_x/T_0)^{1/\gamma} - 1}{(T_x/T_0)^{1/\gamma} + 1}}\right)^{\gamma - 1}\right]$$

$$T_R = \frac{T_0}{2}\left[\left(\frac{T_x}{T_0}\right)^{1/\gamma} + \left(\frac{T_x}{T_0}\right)^{1 - 1/\gamma}\right]$$

This expression gives the value of the temperature at which the substance is after a regenerative operation has been performed between two temperature limits ($T_x$ and $T_0$). Then, if two regenerators are used now $T_{R_2}$ becomes $$T_{R_2} = \frac{T_0}{2}\left[\left(\frac{T_{R_1}}{T_0}\right)^{1/\gamma} + \left(\frac{T_{R_1}}{T_0}\right)^{1 - 1/\gamma}\right]$$

$$T_{R_2} = \frac{T_0}{2}\left[\left(\frac{\frac{T_0}{2}\left[\left(\frac{V_0 + Z}{V_0 - Z}\right) + \left(\frac{V_0 + Z}{V_0 - Z}\right)^{\gamma - 1}\right]}{T_0}\right)^{\gamma/1} + \left(\frac{T_{0/2}\left[\left(\frac{V_0 + Z}{V_0 - Z}\right) + \left(\frac{V_0 + Z}{V_0 - Z}\right)^{\gamma - 1}\right]}{T_0}\right)^{1 - \frac{1}{\gamma}}\right]$$

$$T_{R_2} = \frac{T_0}{2}\left[\left(\frac{\left(\frac{V_0 + Z}{V_0 - Z}\right) + \left(\frac{V_0 + Z}{V_0 - Z}\right)^{\gamma - 1}}{2}\right)^{1/\gamma} + \left(\frac{\left(\frac{V_0 + Z}{V_0 - Z}\right) + \left(\frac{V_0 + Z}{V_0 - Z}\right)^{\gamma - 1}}{2}\right)^{1 - 1/\gamma}\right]$$

This operation can be repeated as many times as we choose.

Let $r$ stand for the compression ratio $V_0/V_1$ then $r = V_0/V_1$ and if $V_1$ is unity, $r = V_0$ or $Z = V_0 - V_1$, $Z = V_0 - 1$ or $Z = r - 1$ so that $T_{\max} = T_0 r^{\gamma - 1}, (2r - 1)^\gamma$.

Now the efficiency $$E_{ff} = \frac{Q_s - Q_r}{Q_s}$$

Where $Q_s$ = heat supplied
$Q_r$ = heat rejected

Then $$E_{ff} = \frac{(T_{max} - T_0) - 2_n(T_{R_n} - T_0)}{T_{max} - T_0}$$

or $$E_{ff} = \frac{r^{\gamma-1}(2r-1)^\gamma - 1 - 2_n\left(\frac{T_{R_n}}{T_0} - 1\right)}{r^{\gamma-1}(2r-1)^\gamma - 1} + 1 - \frac{2_n\left(\frac{T_{R_n}}{T_0} - 1\right)}{r^{\gamma-1}(2r-1)^\gamma - 1}$$

As $T_0$ cancels out when values of $T_{R_n}$ are given, the efficiency is a function of the compression ratio and the number of regenerators used.

Applying the principles used in constructing the cycle whose operation has been described, an unlimited number of cycles can be contrived. That is adiabatic paths can be connected in a number of ways, in such a manner, that the cooling of the substance from one adiabatic to the other be accompanied by a heating process between two other adiabatics, where the cooling and the heating of the substance takes place between the same temperature limits, and that the expansions alternate from the initial volume to a greater volume and from a smaller volume to the initial volume, with compressions alternating in a reversed manner.

As the one whose practical application would probably exceed that of all others, mainly because it permits the use of the counterflow principle in the heating and cooling operations, the cycle of the constant pressure type along the principles established with two regenerative operations will be described in conjunction with FIG. 9.

In FIG. 9 A represents the initial condition of the substance, air gas or the like. From A it is compressed adiabatically to D and from D it is heated in a constant pressure to E. The curve EF then constitutes an adiabatic expansion. From F the substance is cooled at a constant pressure to G, rejecting heat to a regenerator or heat exchanger No. 1 after which it is further expanded to H. The curve HI represents another cooling process at constant pressure, charging regenerator or heat exchanger No. 2. The heat rejected between I and A is lost. Now the substance is back at condition A. From A it is brought up to C where it is at the same temperature it was at G, so that it can be heated to K with heat regained from the first heat exchanger. This is done at a constant pressure also. The curve KH represents another adiabatic expansion.

Now by cooling from H to A we charge the second heat exchanger again between H and I, losing heat, now the second time from I to A. In order to regain the heat lost to the second heat exchanger the substance is compressed adiabatically from A to B again, thus permitting the substance to absorb heat at constant pressure between B and J. The heat absorbed during this operation is equal to the heat rejected during the operation HI. From J an adiabatic expansion will bring the substance to I from where it is cooled back to A. This last subcycle is repeated once more so as to use up all the heat stored in the second heat exchanger. Now the only heat supplied to the system from an external source is during operation DE, and the heat rejected by the system is four times the heat rejected during operation IA. It will be shown that H is uniquely defined by A and D, that is the compression ratio. Now I on the other hand is uniquely defined by H so that the heat rejected in the system is determined by the compression ratio, when a given number of heat exchangers is applied. Thus, along with reference to FIG. 10, the efficiency may be derived as follows:

$$\frac{T_c}{T_b} = \frac{V_0}{V_1} \therefore T_c = T_b \frac{V_0}{V_1}$$

$$T_b = T_a\left(\frac{V_0}{V_1}\right)^{\gamma-1}$$

$$T_c = T_a\left(\frac{V_0}{V_1}\right)^\gamma$$

$$\frac{T_1}{T_2} = \left(\frac{V_4}{V_3}\right)^{\gamma-1} = \frac{V_3}{V_2} = \frac{V_5}{V_4}$$

$$T_2 = T_a\left(\frac{V_0}{V_2}\right)^{\gamma-1}$$

$$T_2 = T_1\left(\frac{V_4}{V_5}\right)$$

$$T_1 = T_c\left(\frac{V_0}{V_5}\right)^{\gamma-1} = T_a\left(\frac{V_0}{V_1}\right)^\gamma\left(\frac{V_0}{V_5}\right)^{\gamma-1}$$

$$T_2 = T_a\left(\frac{V_0}{V_1}\right)^\gamma\left(\frac{V_0}{V_5}\right)^{\gamma-1}\left(\frac{V_4}{V_5}\right) \therefore \left(\frac{V_0}{V_2}\right)^{\gamma-1} = \left(\frac{V_0}{V_1}\right)^\gamma\left(\frac{V_0}{V_5}\right)^{\gamma-1}\left(\frac{V_4}{V_5}\right)$$

$$V_2^{1-\gamma} = \left(\frac{V_0}{V_1}\right)^\gamma\left(\frac{V_4}{V_5^\gamma}\right) \therefore V_2\left(\frac{V_0}{V_1}\right)^{\frac{\gamma}{1-\gamma}} \frac{V_4^{\frac{1}{1-\gamma}}}{V_5^{\frac{\gamma}{1-\gamma}}}$$

$$\frac{V_3}{V_2} = \left(\frac{V_4}{V_3}\right)^{\gamma-1} \therefore \frac{V_5}{V_4} = \left(\frac{V_4}{V_5}\right)^{\gamma-1}$$

$$V_2 = \frac{V_3^\gamma}{V_4^{\gamma-1}}; \quad V_3^{\gamma-1} = \frac{V_4^\gamma}{V_5}; \quad V_2 = \left(\frac{V_0}{V_1}\right)^{\frac{1}{1-\gamma}} \frac{V_4^{1/1-\gamma}}{V_5^{1/1-\gamma}}$$

$$\frac{V_3^\gamma}{V_4^{\gamma-1} - 1} = \left(\frac{V_0}{V_1}\right)^{\frac{\gamma}{1-\gamma}} \frac{V_4^{\frac{1}{1-\gamma}}}{V_5^{\gamma/1-\gamma}}; \quad V_3^\gamma = \left(\frac{V_0}{V_1}\right)^{\frac{\gamma}{1-\gamma}} V_5^{\frac{\gamma}{\gamma-1}} V_4^{\frac{2\gamma-\gamma^2}{1-\gamma}}$$

$$V_3 = \left(\frac{V_0}{V_1}\right)^{\frac{1}{1-\gamma}} V_5^{\frac{1}{1-\gamma}} V_4^{\frac{2-\gamma}{1-\gamma}}; \quad \left(\frac{V_0}{V_1}\right)^{\frac{1}{1-\gamma}} V_5^{\frac{1}{1-\gamma}} V_4^{\frac{2-\gamma}{1-\gamma}} = \frac{V_4^{\frac{\gamma}{\gamma-1}}}{V_5^{\frac{1}{\gamma-1}}}$$

$$V_4^{\frac{2}{\gamma-1}} = \left(\frac{V_0}{V_1}\right)^{\frac{1}{1-\gamma}} V_5^{\frac{2}{\gamma-1}}$$

$$V_4 = \left(\frac{V_1}{V_0}\right)^{\frac{1}{2}} V_5$$

$$T_3 = T_2\left(\frac{V_4}{V_4}\right)^{\gamma-1}; \quad T_2 = T_1\left(\frac{V_4}{V_5}\right); \quad T_1 = T_c\left(\frac{V_0}{V_5}\right)^{\gamma-1}$$

$$T_3 = T_a\left(\frac{V_0}{V_1}\right)^\gamma\left(\frac{V_0}{V_5}\right)^{\gamma-1}\left(\frac{V_4}{V_5}\right)\left(\frac{V_4}{V_4}\right)^{\gamma-1}$$

$$T_3 = T_a = \frac{V_4}{V_0}$$

$$\frac{V_4}{V_0} = \left(\frac{V_0}{V_1}\right)^\gamma\left(\frac{V_0}{V_5}\right)^{\gamma-1}\left(\frac{V_4}{V_5}\right)\left(\frac{V_4}{V_4}\right)^{\gamma-1}$$

$$V_4^\gamma = V_0^{2\gamma} V_5^{-\gamma} V_4^\gamma V_1^{-\gamma}. \quad V_4 = V_0^2 V_5^{-1} V_4 V_1^{-1}$$

$$V_4 = V_0^2 V_5^{-1} V_1^{-1+\frac{1}{2}} V_0^{-\frac{1}{2}} V_5 = V_1^{-\frac{1}{a}} V_0^{\frac{3}{2}}$$

$$V_4 = \sqrt{\frac{V_0^3}{V_1}}$$

$$\frac{T_3}{T_4} = \left(\frac{V_3}{V_2}\right)^{\gamma-1} = \frac{V_2}{V_1} = \frac{V_4}{V_3}$$

$$\left(\frac{V_3}{V_2}\right)^{\gamma-1} = \frac{V_2}{V_1}; V_3^{\gamma-1}V_1 = V_2^{\gamma}$$

$$\left(\frac{V_3}{V_2}\right)^{\gamma-1} = \frac{V_4}{V_3}; V_4 = V_3^{\gamma}V_2^{1-\gamma}$$

$$T_3 = T_4 \frac{V_4}{V_3}$$

$$T_3 = T_4\left(\frac{V_3}{V_2}\right)^{\gamma-1}; T_4 = T_a\left(\frac{V_0}{V_1}\right)^{\gamma-1}; T_3 = T_a\left(\frac{V_0}{V_1}\right)^{\gamma-1}\left(\frac{V_3}{V_2}\right)^{\gamma-1}$$

$$T_4 = T_a \frac{V_3}{V_0}$$

$$T_a\left(\frac{V_3}{V_0}\right)\left(\frac{V_4}{V_3}\right) = T_a\left(\frac{V_0}{V_1}\right)^{\gamma-1}\left(\frac{V_3}{V_2}\right)^{\gamma-1}$$

$$V_4 = V_3^{\gamma-1} \times V_2^{1-\gamma} \times V_1^{1-\gamma} \times V_0^{\gamma}$$

$$V_4 = V_3^{\gamma-1}V_2^{1-\gamma}V_1^{1-\gamma}V_0^{\gamma}$$

$$V_1 = V_4^{\frac{1}{1-\gamma}} V_3 V_2^{-1} V_0$$

$$V_4 = V_3^{\gamma} V_2^{1-\gamma}$$

$$V_2 = V_4^{\frac{1}{1-\gamma}} V_3^{\frac{\gamma}{\gamma-1}}$$

$$V_3 = V_2^{\frac{\gamma}{\gamma-1}} V_1^{-\frac{1}{\gamma-1}}$$

$$V_1 = V_3^{1-\gamma} V_2^{\gamma}$$

$$V_4^{\frac{1}{1-\gamma}} V_3 V_2^{-1} V_0^{\frac{\gamma}{\gamma-1}} = V_3^{1-\gamma} V_2^{\gamma}$$

$$V_2^{\gamma+1} = V_3^{\gamma} V_4^{\frac{1}{1-\gamma}} V_0^{\frac{\gamma}{\gamma-1}}$$

$$V_2 = V_3^{\frac{\gamma}{\gamma+1}} V_4^{\frac{1}{1-\gamma^2}} V_0^{\frac{\gamma}{\gamma^2-1}}$$

$$V_4^{\frac{1}{1-\gamma}} V_3^{\frac{\gamma}{\gamma-1}} = V_3^{\frac{\gamma}{\gamma+1}} V_4^{\frac{1}{1-\gamma^2}} V_0^{\frac{\gamma}{\gamma^2-1}}$$

$$V_3^{\frac{2\gamma}{1-\gamma^2}} = V_4^{\frac{\gamma}{1-\gamma^2}} V_0^{\frac{\gamma}{1-\gamma^2}}$$

$$V_3 = V_4^{\frac{1}{2}} V_0^{\frac{1}{2}}$$

$$V_4 = \sqrt{\frac{V_0^3}{V_1}}$$

$$V_3 = V_0^{\frac{1}{2}} V_1^{-\frac{1}{4}} V_0^{\frac{3}{4}} = V_1^{-\frac{1}{4}} V_0^{\frac{5}{4}}$$

$$V_3 = \left(\frac{V_0^5}{V_1}\right)^{\frac{1}{4}}$$

if $V_1$ is taken as unity and the ratio of compression $$r = \frac{V_0}{V_1}$$

if $V_1$ is taken as unity and the ratio of compression $$r = \frac{V_0}{V_1}$$

then $r = V_0$ and $V_3 = r^{5/4}$ $$T_4 = \frac{V_3 P_a}{C}; P_a = \frac{T_a C}{V_0}; T_4 = T_a \frac{V_3}{V_0} = T_a \frac{r^{5/4}}{r} = T_a r^{1/4}$$

The work done $W = Q_s - Q_r$ $$Q_s = K_p(T_c - T_b) = K_p(T_{ar}^{\gamma} - T_{ar}^{\gamma-1}) = K_p T_a(r^{\gamma} - r^{\gamma-1})$$

$$Q_r = 4K_p(T_4 - T_a) = 4K_p\left(T_{ar}^{\frac{1}{4}} - T_a\right) = 4K_p T_a\left(r^{\frac{1}{4}} - 1\right)$$

Then the efficiency $$E_{ff} = \frac{H_a - H_r}{H_a} = \frac{(r^{\gamma} - r^{\gamma-1}) - 4\left(r^{\frac{1}{4}} - 1\right)}{r^{\gamma} - r^{\gamma-1}}$$

or $$E_{ff} = 1 - \frac{\left(4r^{\frac{1}{4}} - 1\right)}{r^{\gamma} - r^{\gamma-1}}$$

Referring now more particularly to FIG. 11, there will be described a closed system heat plant arranged to operate according to the foregoing principles. In the illustrated system the letter M refers to the mass of the fluid such as air, gas or the like which is circulated through the system. For purposes of illustration, it will be assumed that the system is being used as a heat engine to perform work such generating electricity, for example. Obviously the system may be employed for any number of purposes and by a reversal of the cycle it may also be employed as a refrigerating system.

In any event the description of the system will be made in conjunction with FIG. 9 of the drawings. Starting at point A in the system and the corresponding point A on the PV curve, we will assume that four units of gas are delivered from a cooler 14. From the cooler 14, the four units of gas are compressed by a compressor 16 where the volume of the gas is decreased and its pressure increased as indicated by the curve AB in FIG. 9. One-half of the discharge from the compressor 16 is delivered to a compressor 18 where this portion of the gas is compressed by an amount corresponding to the curve BC of FIG. 9. Again one-half of the discharge from the compressor 18 is delivered to a third compressor 20 where the gas is again compressed by an amount corresponding to the curve CD of FIG. 9. At this point one unit of gas mass is delivered to a heater 22 wherein the temperature of the gas is raised from $T_d$ to $T_e$ at a constant pressure. The heated gas is then delivered to the first stage 24 of a turbine where the gas expands by an amount corresponding to the curve EF of FIG. 9. The exhausted gas is then passed through a counterflow heat exchanger or regenerator 26 and provides one-half of the gas mass input to a third stage 28 of the turbine.

Passing counterflow to the exhaust from the stage 24 through the heat exchanger 26 is one-half of the output from the compressor 18. Within the heat exchanger the counterflowing gasses undergo a change in volume indicated by the curve CK FIG. 9 and change from temperature $T_1$ to $T_2$. Constant pressure is maintained during this heat exchanging operation. The discharge from the compressor 18 is then fed into a second stage 30 of the turbine where it undergoes an expansion corresponding to the curve KG of FIG. 9. The exhaust from the stage 30 is then combined with the exhaust from the stage 24 for delivery into the third stage 26. There are now two units of gas mass delivered through the stage 26 and this gas undergoes an expansion corresponding to the curve GH. The exhaust is then passed through a second heat exchanger 32 in counterflow to two units of gas mass from the compressor 16. This discharge from the compressor 16 undergoes a heat exchange from $T_4$ to $T_3$ before entering a fourth stage 34 of the turbine. At the same time the exhaust from the stage 26 undergoes a heat exchange from $T_3$ to $T_4$. The gas is maintained in both directions at a constant pressure, and the change in condition is indicated by the curve HI in FIG. 9.

In the turbine stage 34 the two gas units undergo an expansion corresponding to the curve JI in FIG. 9 and the exhaust is combined with the third stage exhaust at temperature $T_4$ for delivery into the cooler 14 where it undergoes a change in condition indicated by the curve IA in FIG. 9 thereby returning the gas to its original condition.

It will be understood that the cycle may be repeated continuously and that the efficiency of the system may be increased by merely adding further expansion, compression and heat exchanging stages. Theoretically the efficiency will approach 100% as the number of regenerative stages approaches infinity.

While the invention has been described with particular reference to the illustrated embodiment, it will be understood numerous modifications thereto may be made by those skilled in the art and the principles underlying the invention may be applied to heat engines of other design or to refrigeration systems as desired. Accordingly, the above description and accompanying drawings should be taken as illustrative of the invention and not in a limiting sense.

Having thus described the invention, what I claim and desire to obtain by Letters Patent of the United States is:

1. A heat plant of the sort employing a gas as a heat transfer medium, comprising
   (a) cooling means for lowering the temperature of all of said gas to one temperature limit,
   (b) a series of compressor stages each adapted to compress in stages a portion of the mass of gas in the preceding stage,
   (c) a series of expansion stages adapted to expand portions of the gas in stages,
   (d) heating means for raising the temperature of a portion of said gas to another temperature limit, and
   (e) heat exchanging means for cooling said gas between one pair of expansion stages and heating said gas for another pair of expansion stages between the same temperature limits.

2. A heat plant according to claim 1 wherein said heat exchanging means comprises a counterflow regenerator.

3. A heat plant according to claim 1 wherein said expansion stages comprise portions of a turbine.

4. A heat plant of the sort employing a gas as a heat transfer medium, comprising
   (a) cooling means for lowering the temperature of all of said gas to one temperature limit,
   (b) a series of connected compressor stages each adapted to compress in stages a portion of the mass of gas from a preceding stage,
   (c) a series of connected expansion stages adapted to expand portions of the gas in stages,
   (d) heating means for raising the temperature of a portion of said gas to another temperature limit at a constant pressure, and
   (e) constant pressure exchanging means for cooling said gas between one pair of expansion stages and heating portions of said gas from said compressor stages for another pair of expansion stages between the same temperature limits.

5. The method of cycling a gaseous medium in a heat system, comprising the steps of
   (a) compressing said medium adiabatically from an intermediate volume to a smaller volume,
   (b) heating said medium at a constant pressure,
   (c) expanding said medium adiabatically to a greater volume,
   (d) cooling said substance at a constant pressure,
   (e) further expanding said medium
   (f) again cooling said substance at a constant pressure and returning it to its original condition,
   (g) again compressing said medium and heating said medium at constant pressure by said first cooling step,
   (h) again expanding said medium adiabatically,
   (i) again cooling said medium,
   (j) again compressing said medium adiabatically and absorbing heat from a previous cooling step,
   (k) again expanding said medium adiabatically and again cooling it to its original temperature.

6. The method of cycling a gas in a heat system, comprising the steps of
   (a) passing said gas through a plurality of compression and expansion cycles of different pressure-volume parameters,
   (b) cooling said gas from one adiabatic to another by heating to two other adiabatics,
   (c) said cooling and heating steps being between the same temperature limits,
   (d) said expansion cycles being alternated from an initial volume to a greater volume and from a smaller volume to the initial volume, and
   (e) said compression cycles being alternated from a greater volume to an initial volume and from an initial volume to a smaller volume.

7. The method of improving the efficiency of a gas operated heat plant having heating and cooling means, compression and expansion means and heat exchanging means, comprising the steps of
   (a) cycling different portions of said gas through different compression and expansion cycles, and
   (b) cyclically cooling and heating the gas in said cycles by transferring heat from a cooling stage in one cycle to a heating stage in another cycle between the same temperature limits.

References Cited by the Examiner

UNITED STATES PATENTS 2,268,270   12/1941   Traupel _____ 60—59

FOREIGN PATENTS 1,134,788   8/1962   Germany.

EDGAR W. GEOGHEGAN, *Primary Examiner.*